United States Patent
Kakiuchi et al.

(10) Patent No.: US 7,198,384 B2
(45) Date of Patent: Apr. 3, 2007

(54) LIGHT EMITTING DEVICE

(75) Inventors: Shinichi Kakiuchi, Saitama (JP); Shuzo Seo, Saitama (JP)

(73) Assignee: PENTAX Corporation, Tokyo (JP)

( * ) Notice: Subject to any disclaimer, the term of this patent is extended or adjusted under 35 U.S.C. 154(b) by 309 days.

(21) Appl. No.: 10/954,184

(22) Filed: Oct. 1, 2004

(65) Prior Publication Data

US 2005/0073760 A1   Apr. 7, 2005

(30) Foreign Application Priority Data

Oct. 2, 2003   (JP) ............. P2003-344269

(51) Int. Cl.
*F21V 7/04*   (2006.01)

(52) U.S. Cl. ............ 362/293; 362/300; 362/311; 362/600

(58) Field of Classification Search ........ 362/603, 362/604, 600, 612, 308, 297, 300, 310, 311
See application file for complete search history.

(56) References Cited

U.S. PATENT DOCUMENTS 3,356,839 A * 12/1967 Mineo et al. ........... 362/604
5,155,635 A   10/1992 Kakiuchi
6,522,487 B2 * 2/2003 Memezawa et al. ...... 359/833
6,598,998 B2 * 7/2003 West et al. ............. 362/307
6,603,519 B2 * 8/2003 Fukiharu ................ 349/63

FOREIGN PATENT DOCUMENTS

JP   2002-148686   5/2002

* cited by examiner

*Primary Examiner*—Sandra O'Shea
*Assistant Examiner*—Anabel Ton
(74) *Attorney, Agent, or Firm*—Greenblum & Bernstein, P.L.C.

(57) ABSTRACT

A fluorescent structure is provided on a curved recess plane of a reflector. The fluorescent structure has a shape of a cylinder which is cut by a plane including its central axis and along its longitudinal direction. An inner wall of the fluorescent structure tapers in like a cone from both ends to the central portion of the fluorescent structure. The structure includes a fluorescent material, for example YAG, which converts blue light to white light and diffuses the white light. Blue LEDs are provided close to both ends of the structure. The blue LEDs are positioned such that blue light emitted from the blue LED enters from both ends and is led to the central portion.

7 Claims, 4 Drawing Sheets

LIGHT EMITTING DEVICE

BACKGROUND OF THE INVENTION

1. Field of the Invention

The present invention relates to a light emitting device which includes a light emitting diode.

2. Description of the Related Art

In recent years, high brightness LEDs and white LEDs have been developed, and the usage of these LEDs has diversified. For example, in place of a xenon lamp, a lighting device which includes a plurality of LEDs is used for a flash of a camera. A capacitor has to be mounted to use the xenon lamp. Accordingly, an inner space of camera is reduced. Further, the mounting of the capacitor is dangerous because of its high voltage. These problems can be solved by using LEDs.

However, leads and wires are provided around a chip of an LED. Namely, in the LED, light emitting members (chips) and non-emitting members (leads and wires) are arranged together. Accordingly, if light which is emitted from an LED is directly led to an object, the images of the chip and the other members which are close to the chip are projected on the object, and the luminance brightness becomes uneven.

Further, the LED chip is extremely minute, and the light emitting device which includes the white LEDs is substantially a point light source which is minute. If a human is an object of the photography, there is a problem that it is uncomfortable for the human to see the point light source.

SUMMARY OF THE INVENTION

Therefore, an object of the present invention is to provide a light emitting device, including an LED as a light source, which can supply light, the luminance brightness of which is not uneven, and which is safe for human eyes.

In accordance with an aspect of the present invention, there is provided a light emitting device comprising: a semiconductor light emitting element that includes a first light emitting plane; a reflecting structure that reflects a first emitting light which is emitted from the first light emitting plane; and a secondary light emitting structure that diffuses the light reflected by the reflecting structure and emits the diffused light from a predetermined secondary light emitting plane. The normal line of the first light emitting plane and the normal line of the secondary light emitting plane cross at right angles.

The secondary light emitting structure is a cylindrical member which is cut by a plane including the central axis of the cylindrical member and in the longitudinal direction of the cylindrical member, and the cylindrical member includes an inner plane which tapers in, like cones, from both ends of the cylindrical member to the central portion of the cylindrical member.

A radial length of the inner plane of the cylindrical member is gradually shortened from both ends to the central portion.

The semiconductor light emitting element is positioned such that the light emitted from the semiconductor light emitting element enters from at least one of both ends and is led to the central portion.

The semiconductor light emitting element emits blue light, and the secondary light emitting structure is a fluorescent structure which converts the blue light to white light and diffuses the white light and emits the white light from the predetermined secondary light emitting plane which forms one portion of an outer plane of the cylindrical member.

The reflecting structure has a cross sectional shape which is curved, and the secondary light emitting structure is positioned in a curved recess portion of the reflecting structure such that the outer plane of the secondary light emitting structure faces the side opposite to a curved recess plane of the curved recess portion.

In accordance with another aspect of the present invention, there is provided a light emitting device comprising: a semiconductor light emitting element that includes a first light emitting plane; a reflecting structure that reflects primary light which is emitted from the first light emitting plane; a secondary light emitting structure that diffuses light reflected by the reflecting structure and emits secondary light, which is diffused light, from a predetermined secondary light emitting plane. The direction in which the first light emitting plane faces and the normal line of the secondary light emitting plane cross at right angles.

According to the present invention, the light emitting device is provided with the secondary light emitting structure which diffuses light emitted from the semiconductor light emitting element and emits the diffused light. Accordingly, when the light emitted from the semiconductor light emitting element is led to an object through a leading optical system, unevenness of the luminance brightness on the object can be prevented.

Further, if the object to be photographed is a human, the light emitted from the semiconductor light does not directly enter his or her eyes. Accordingly, the light emitting device does not irritate his or her eyes.

If each member of the light emitting device is positioned in such a manner that the light from the secondary light emitting structure is led so as to be along the optical axis of the light from the semiconductor light emitting element, it is necessary to prepare a space for an optical path from the first light emitting plane to the secondary light emitting structure, in the direction the secondary light is led. Accordingly, it is difficult to reduce the length of the light emitting device in the direction in which the light from the secondary light emitting structure is led.

However, according to the present invention, the semiconductor light emitting element is positioned such that the straight line perpendicular to the first light emitting plane (the normal line of the first light emitting plane) crosses the secondary light emitting plane of the secondary light emitting structure at right angles. Due to this arrangement of the semiconductor light emitting element, the above-mentioned length of the light emitting device can be reduced. Accordingly, the light emitting device can be wholly compacted.

BRIEF DESCRIPTION OF THE DRAWINGS

The objects of the present invention will be better understood from the following description, with reference to the accompanying drawings, in which.

DESCRIPTION OF THE PREFERRED EMBODIMENTS

Figure 1:
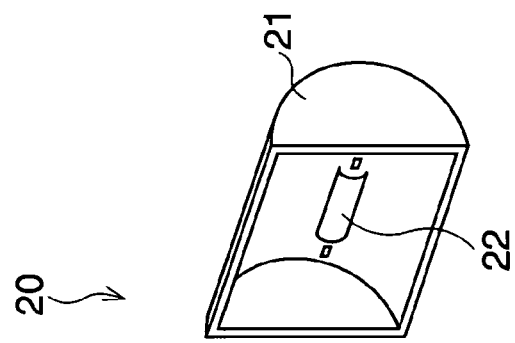
FIG. 1 is a view which conceptionally shows a leading optical system and a light emitting device to which an embodiment according to the present invention is applied.
Figure 1:
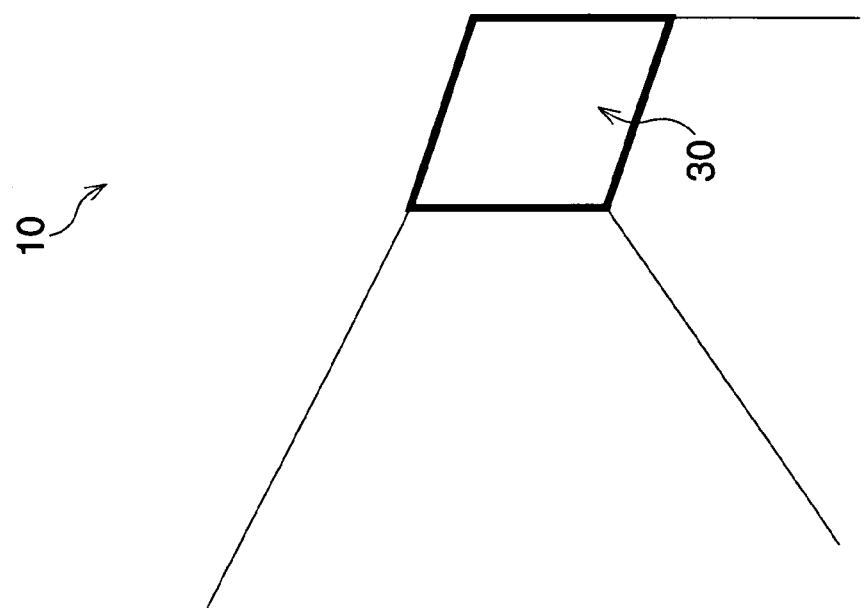

The present invention will now be described with reference to an embodiment shown in the drawings.

FIG. 1 is a view which conceptually shows a lighting unit which includes a light emitting device to which an embodiment according to the present invention is applied. The lighting unit 10 includes a light emitting device 20 and a leading optical system 30. Light, which is emitted from the device 20, is diffused and is led to an object, by the leading optical system 30.

Figure 2:
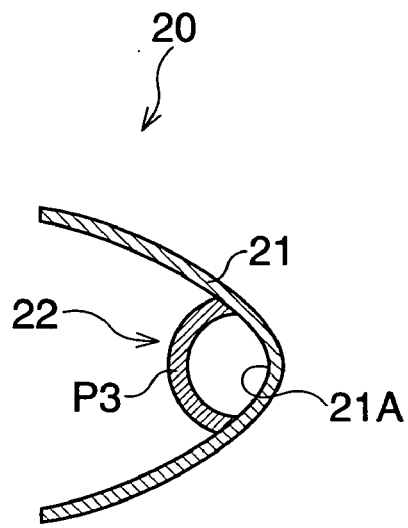
FIG. 2 is a sectional end view of a reflector of the light emitting device.

FIG. 2 is a sectional end view of the light emitting device 20 which is cut at its center being along the longitudinal direction. A reflector 21 has a structure similar to a reflector which is used in a flash of a conventional xenon lamp. Namely, as shown in FIG. 2, a cross sectional shape of the reflector 21 is parabolically curved, and the inner wall which corresponds to a recess portion of the reflector 21 is a reflecting member.

Figure 3:
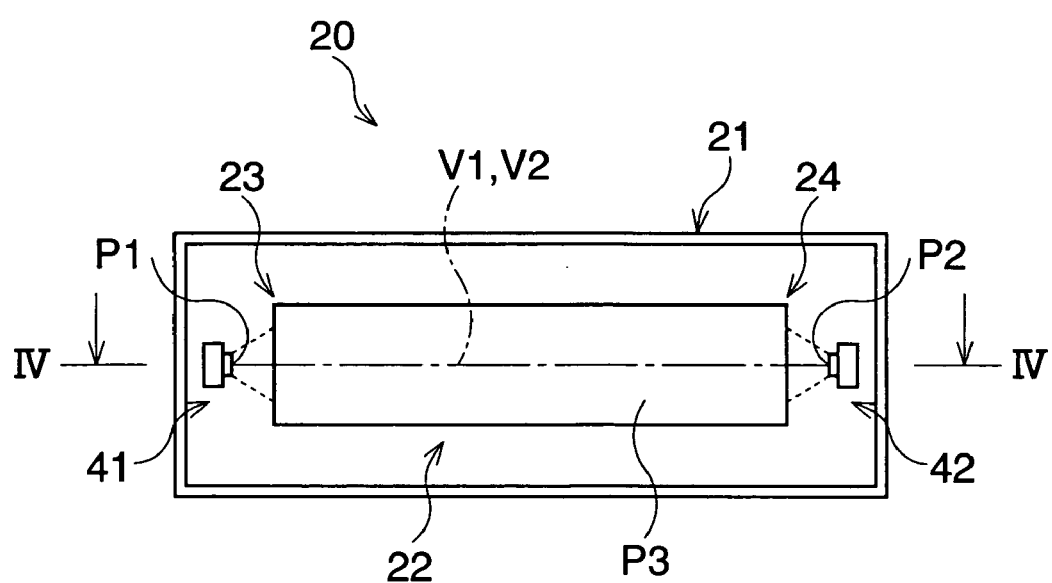
FIG. 3 is a front view of the reflector.
Figure 4:
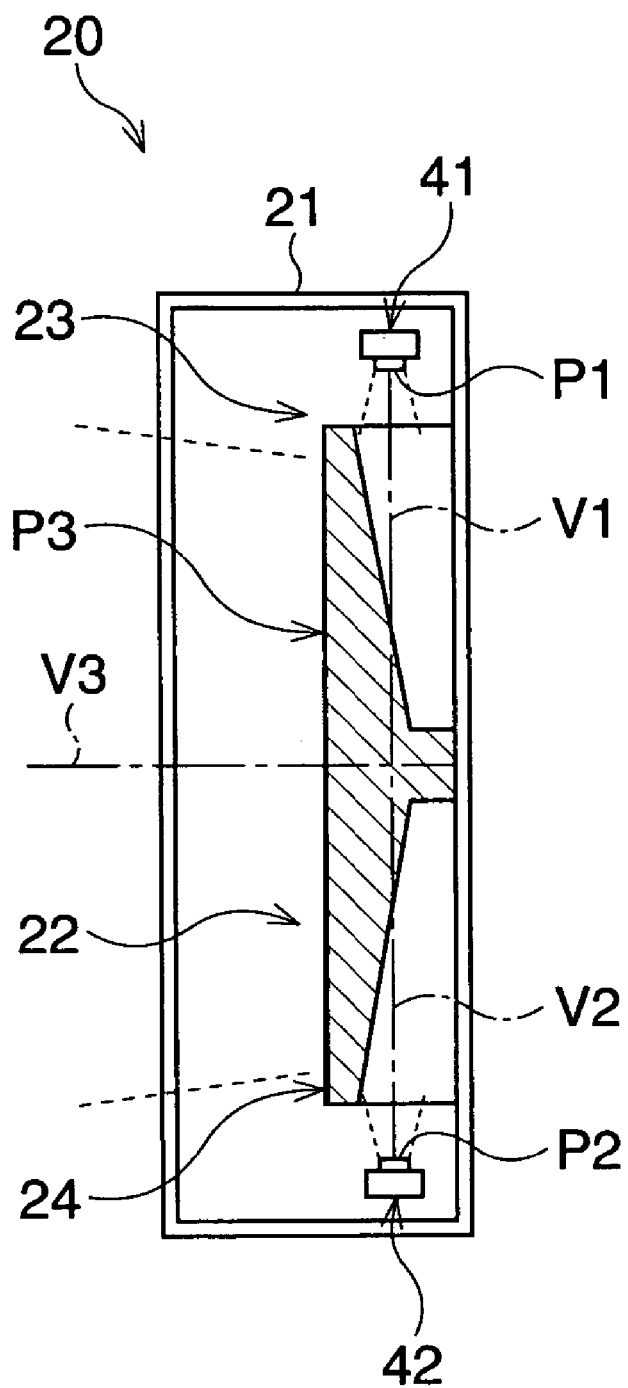
FIG. 4 is a sectional view taken in the direction of the arrows substantially along the line IV—IV of FIG. 3.
Figure 5:
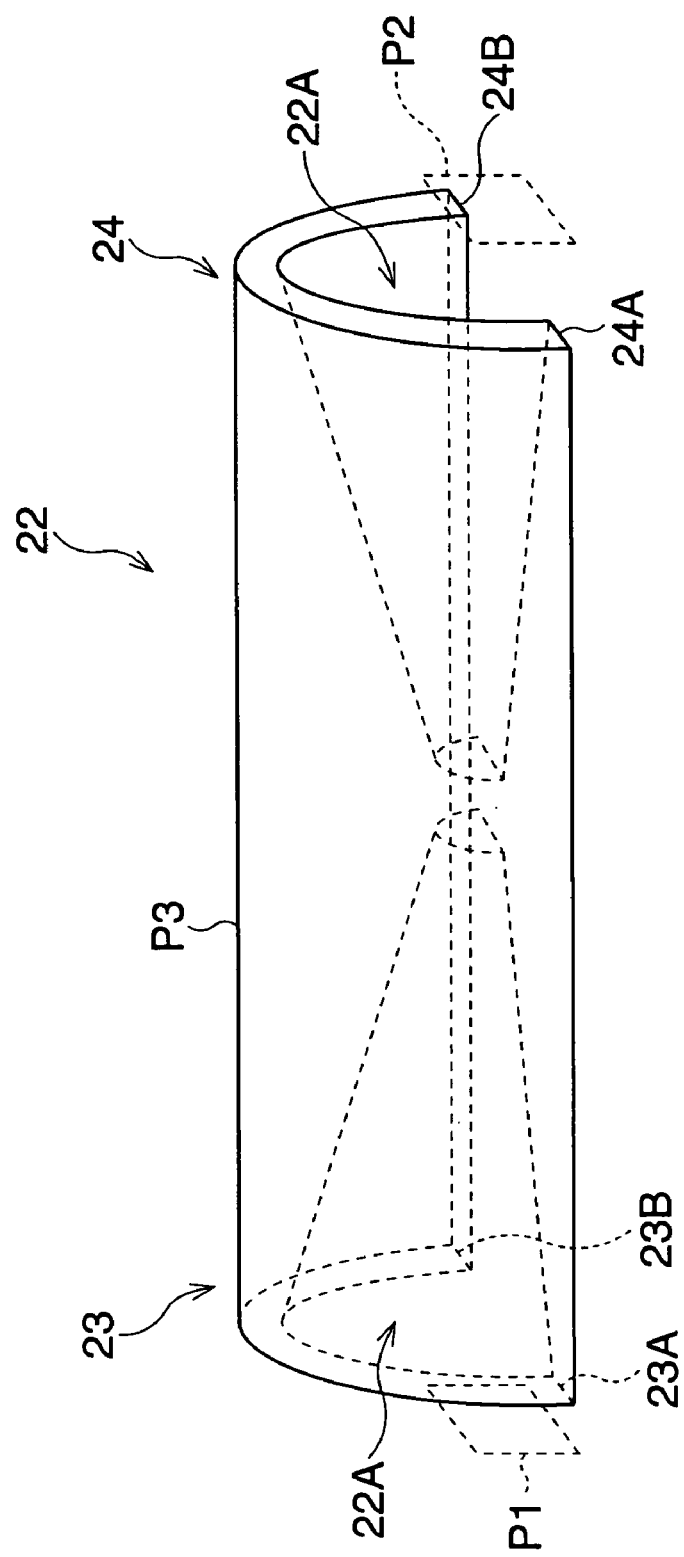
FIG. 5 is a sectional view of the fluorescent structure.

FIG. 3 is a front view of the light emitting device 20, and FIG. 4 is a sectional view taken in the direction of the arrows substantially along the line IV—IV of FIG. 3. A fluorescent structure 22 (secondary light emitting structure) is provided on a curved plane 21A, which is the recess portion (see FIG. 2), of the reflector 21. FIG. 5 is a perspective view of the fluorescent structure 22. In FIG. 5, an inner shape of the structure 22 is depicted by broken lines. The exterior of the structure 22 has a shape of a cylindrical member which is cut by a plane including its central axis and in its longitudinal direction.

An inner plane 22A of the fluorescent structure 22 tapers in like cones in such a manner that its radial length is gradually shortened from both ends 23, 24 to the central portion of the structure 22. Edge portions 23A, 23B, which are along the radial direction of a base surface close to the end portion 23, are in touch with the curved plane 21A, as shown in FIG. 2. Also, edge portions 24A, 24B, which are along the radial direction of another base surface close to the end portion 24, are in touch with the curving plane 22A. In other words, the outer plane of the structure 22 faces the side opposite to the curved plane 21A.

The fluorescent structure 22 converts an incident blue light to a white light and diffuses the white light. The white light is emitted out from a secondary light emitting plane P3. The plane P3 corresponds to an outer surface of a cylinder. Note that, the structure 22 includes a fluorescent material, for example YAG (Yttrium Aluminum Garnet).

As shown in FIGS. 3 and 4, blue LEDs 41, 42 are respectively provided close to the end portions 23, 24. The blue LEDs 41, 42 respectively emit a blue light from light emitting planes P1, P2 (first light emitting planes) which are approximately flat. The blue LED 41 is arranged in such a manner that its emitting light enters from the end portion 23 and is led to the center portion of the structure 22, and the blue LED 42 is arranged in such a manner that its emitting light enters from the end portion 24 and is led to the center portion of the structure 22.

One part of the light which is emitted from the light emitting planes P1, P2 and enters the inner space of the structure 22 from the end portions 23, 24, is reflected by the inner wall of the reflector 21 and is entered in the inner portion of the structure 22. Blue light is converted to white light, and the white light is diffused, by the fluorescent material of the structure 22, and the white light is emitted from the secondary emitting plane P3 of the structure 22. Further, the other part of the blue light which enters from the end portions 23, 24 directly enters the inner portion of the structure 22. The entered blue light is similarly converted to white light and diffused by the fluorescent material, and the white light is emitted from the secondary light emitting plane P3 of the structure 22.

As described above, in this embodiment, the inner wall 22A of the fluorescent structure 22 tapers in like cones, the radial length of which is gradually shortened from both ends 23, 24 to the central portion. Accordingly, the light which is directly emitted from the blue LED 41, and which is slightly spread in the direction V1; the light which is directly emitted from the blue LED 42, and which is slightly spread in the direction V2; and the light reflected by the reflector 21: can be efficiently led to the inside of the fluorescent structure 22.

As shown in FIG. 4, the direction of the normal line V1 (V2) of the light emitting plane P1 (P2) of the blue LED 41 (42) (in other words, the optical axis of the light emitted from the blue LED 41 (42)) corresponds to the longitudinal direction of FIG. 4. The light emitted from the light emitting plane P1 (P2) is deflected at approximately right angles, and the deflected light is emitted from the secondary emitting plane P3, to the left, in FIG. 4.

Namely, the normal line V1 (V2) of the light emitting plane P1 (P2) of the blue LED 41 (42) and the line V3 of the secondary light emitting plane P3 of the fluorescent structure 22 cross at right angles. In other words, the direction, in which the light emitting planes P1 and P2 face, cross the normal line V3 of the secondary light emitting plane P3.

Due to the positional relationship between the light emitting planes P1, P2 and the secondary light emitting plane P3, the length of the light emitting device 20 in the direction in which the light is led by the structure 22 can be shortened. Further, a user, who stands at the side of the secondary light emitting plane P3, cannot directly view the light emitting planes P1 and P2 of the blue LEDs 41, 42. Accordingly, the light emitting planes P1 and P2 do not irritate the user's eyes, and the lighting unit 10 is safe for the user's eyes.

Further, according to this embodiment, a reflector of a flash which includes a conventional xenon lamp can be used. Accordingly, it is unnecessary to prepare an extra reflector, so that the cost can be reduced.

Note that, in place of the blue LED, a lamp-type light emitting element, in which a light emitting structure is sealed by a resin, can be used. When the lamp-type element is mounted, the element is arranged such that the optical axis of the optical system which is formed by the sealing resin crosses the normal line of the secondary light emitting plane P3 at right angles.

The present disclosure relates to subject matter contained in Japanese Patent Application No.2003-344269 (filed on, Oct. 2, 2003) which is expressly incorporated herein, by reference, in its entirety.

The invention claimed is:

1. A light emitting device, comprising:
a semiconductor light emitting element that includes a first light emitting plane;
a reflecting structure that reflects a first emitting light which is emitted from said first light emitting plane; and
a light emitting structure that diffuses the light reflected by said reflecting structure and emits the diffused light from a predetermined secondary light emitting plane; wherein
the normal line of said first light emitting plane and the normal line of said secondary light emitting plane cross at right angles.

2. A light emitting device according to claim 1, wherein said light emitting structure is a cylindrical member which is cut by a plane including the central axis of said cylindrical member and in the longitudinal direction of said cylindrical member, and said cylindrical member includes an inner plane which tapers in, like cones, from both ends of said cylindrical member to the central portion of said cylindrical member.

3. A light emitting device according to claim 2, wherein a radial length of said inner plane of said cylindrical member is gradually shortened from said both ends to said central portion.

4. A light emitting device according to claim 2, wherein said semiconductor light emitting element is positioned such that the light emitted from said semiconductor light emitting element enters from at least one of said both ends and is led to said central portion.

5. A light emitting device according to claim 2, wherein said semiconductor light emitting element emits blue light, and said light emitting structure is a fluorescent structure which converts said blue light to white light and diffuses said white light and emits said white light from said predetermined secondary light emitting plane which forms one portion of an outer plane of said cylindrical member.

6. A light emitting device according to claim 2, wherein said reflecting structure has a cross sectional shape which is curved, and said light emitting structure is positioned in a curved recess portion of said reflecting structure such that the outer plane of said light emitting structure faces the side opposite to a curved recess plane of said curved recess portion.

7. A light emitting device comprising:
   a semiconductor light emitting element that includes a first light emitting plane;
   a reflecting structure that reflects primary light which is emitted from said first light emitting plane; and
   a light emitting structure that diffuses light reflected by said reflecting structure and emits secondary light, which is diffused light, from a predetermined secondary light emitting plane; wherein
   the direction in which said first light emitting plane faces and the normal line of said secondary light emitting plane cross at right angles.

* * * * *